United States Patent Office 2,910,910
Patented Nov. 3, 1959

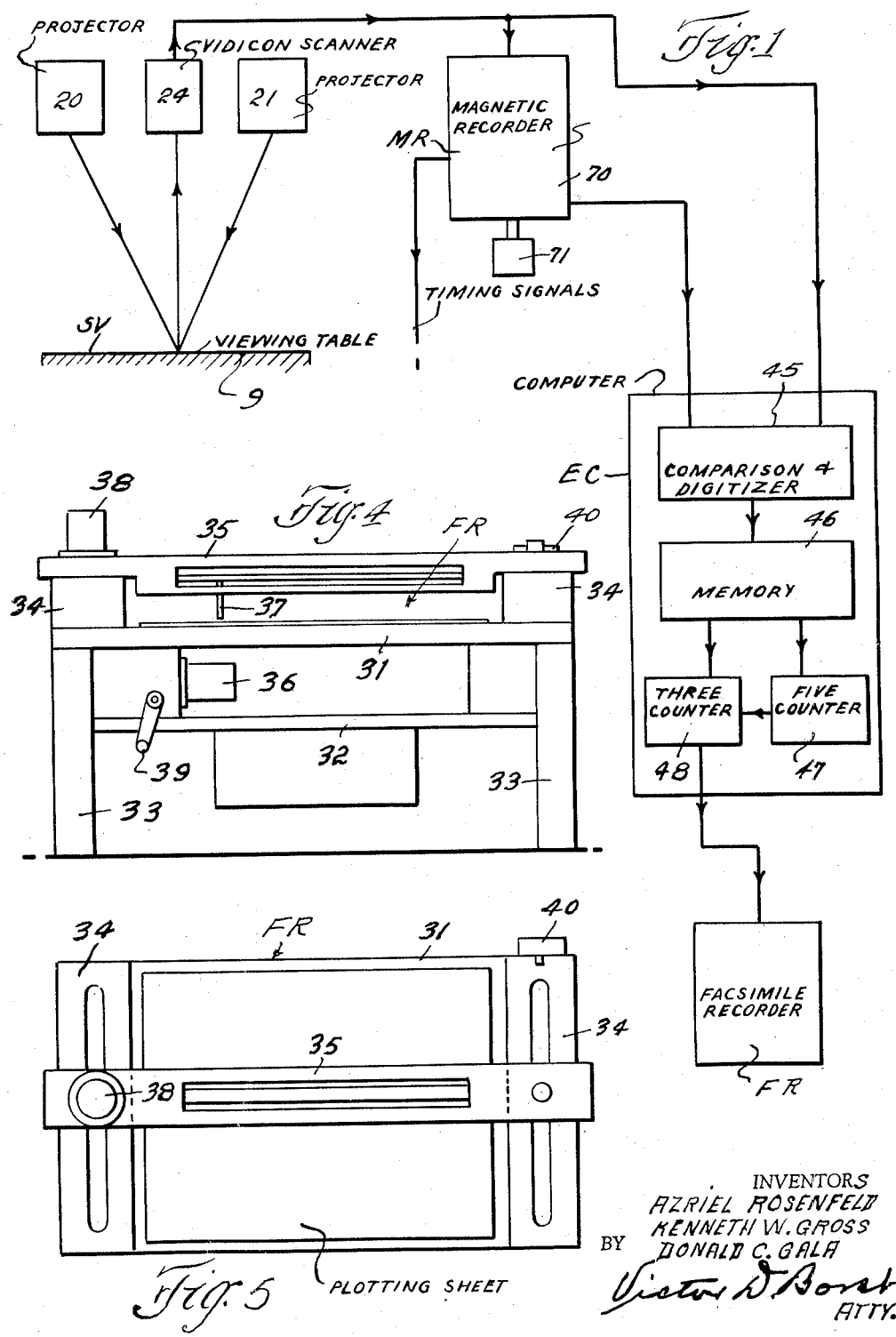

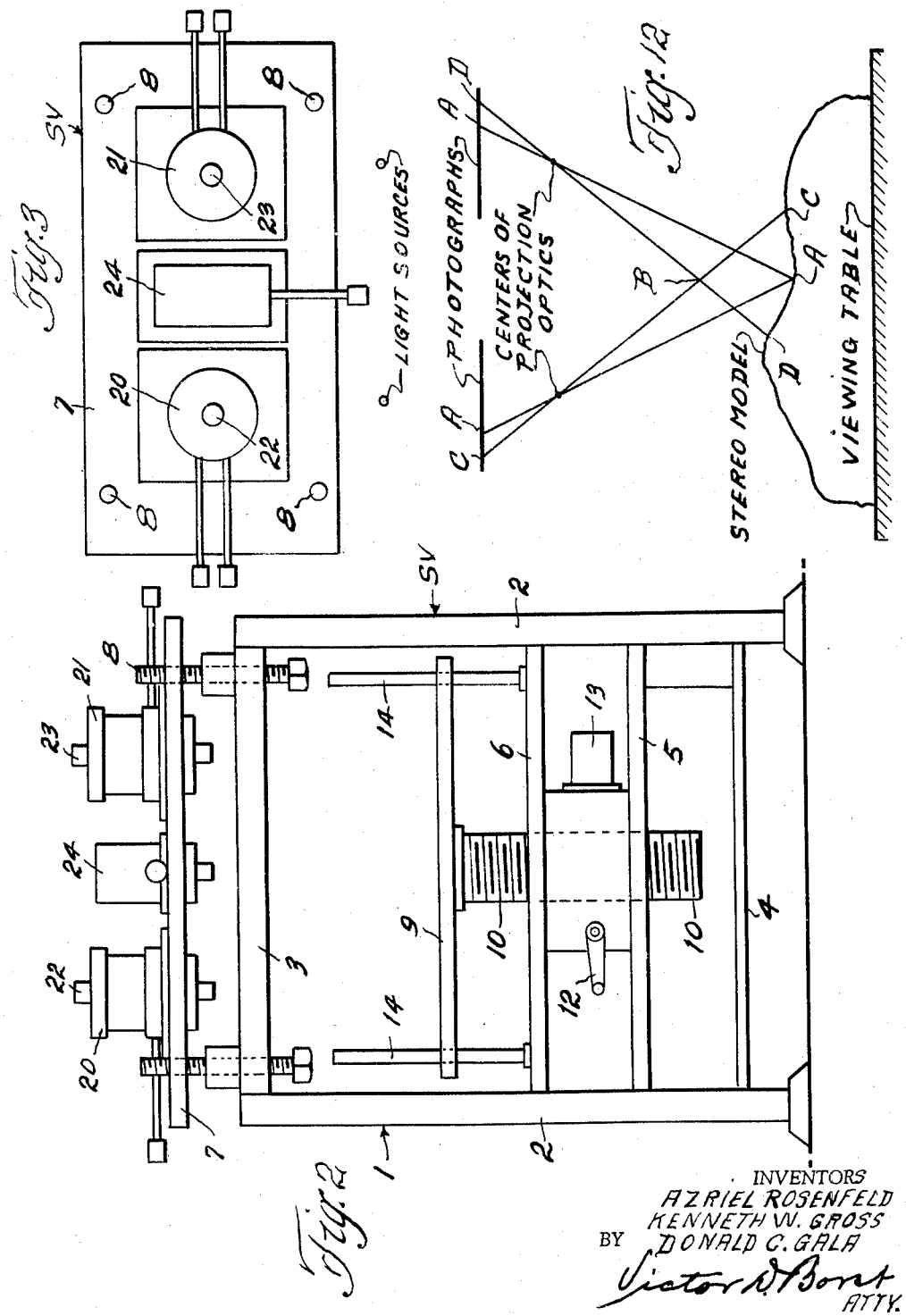

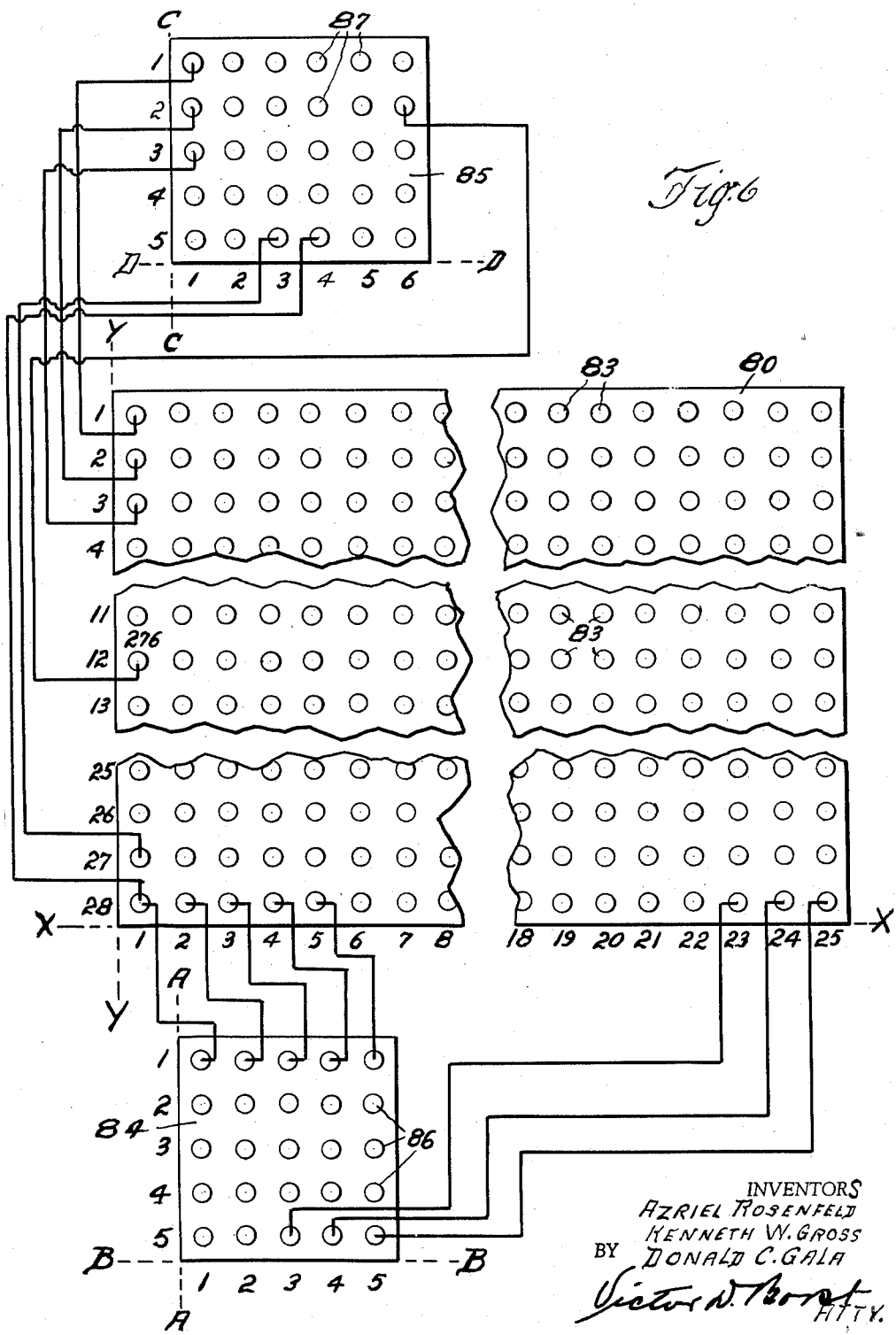

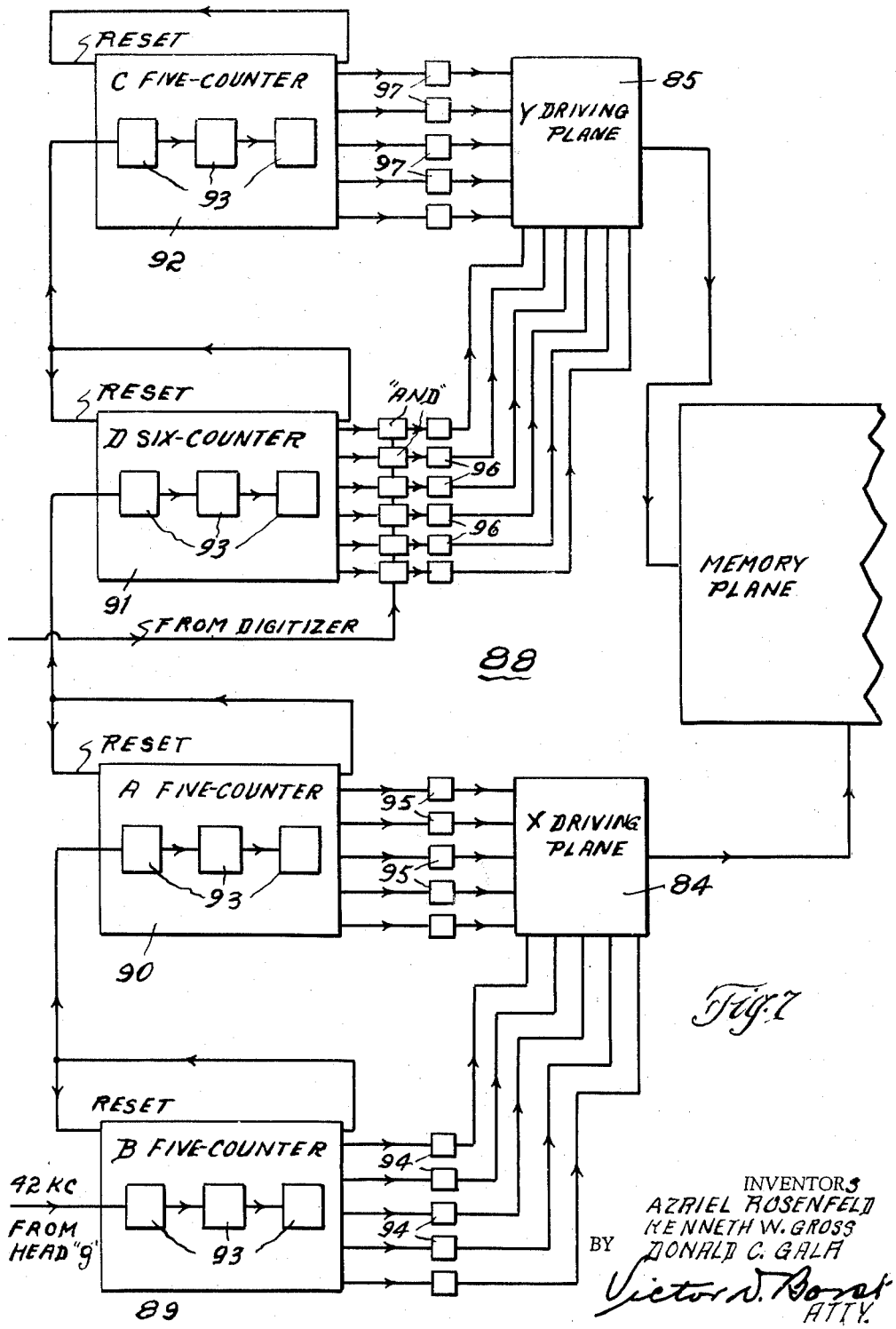

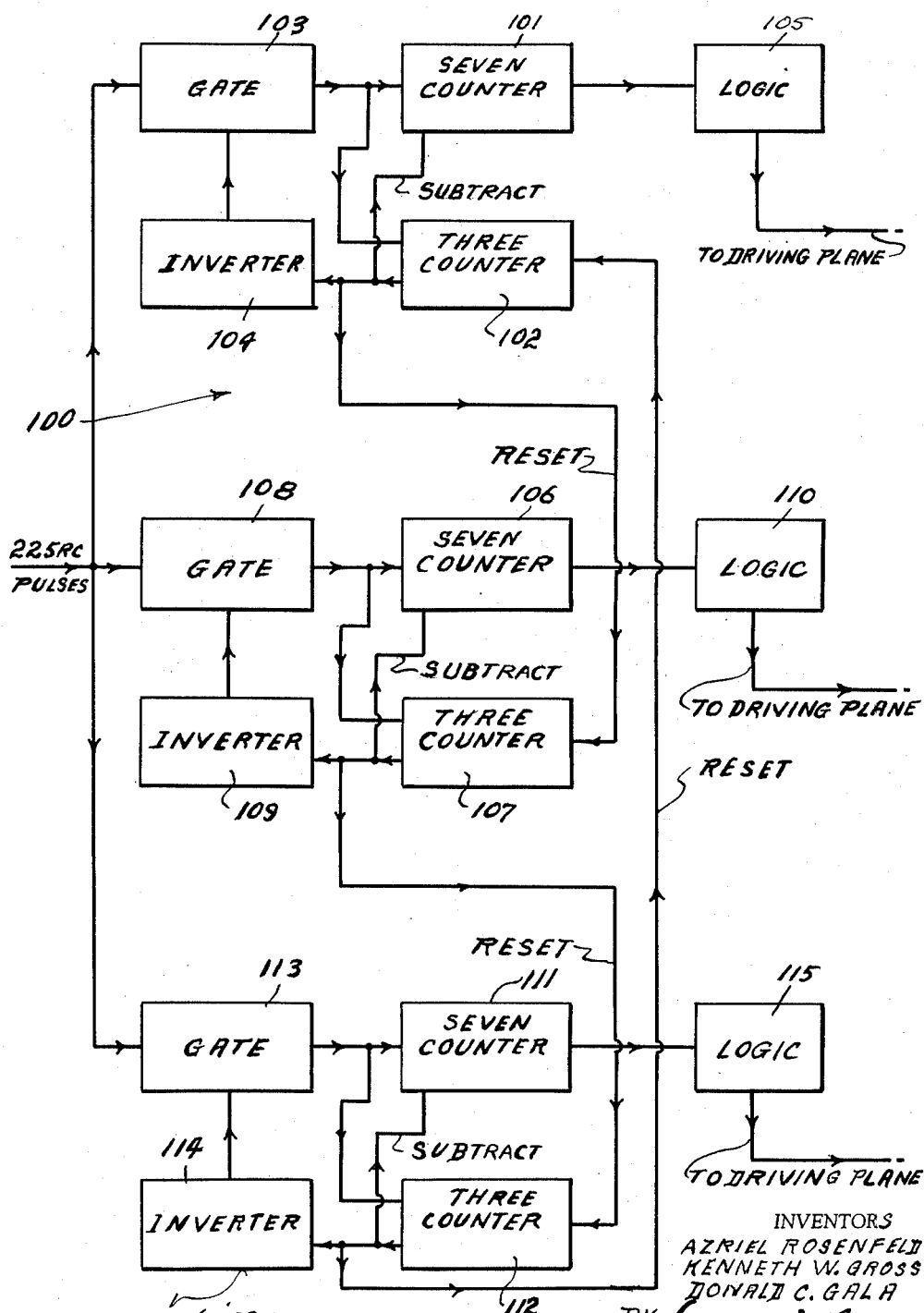

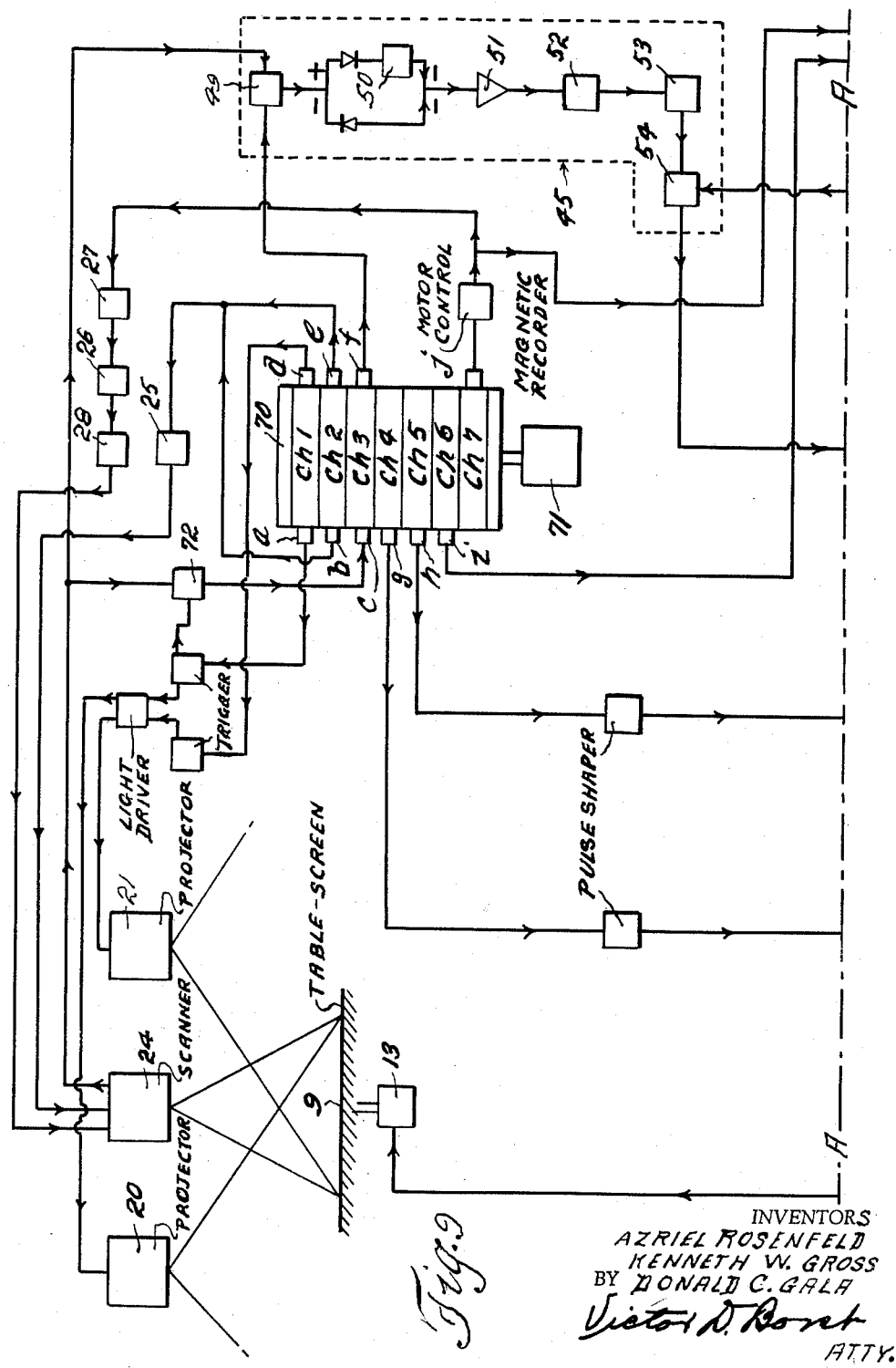

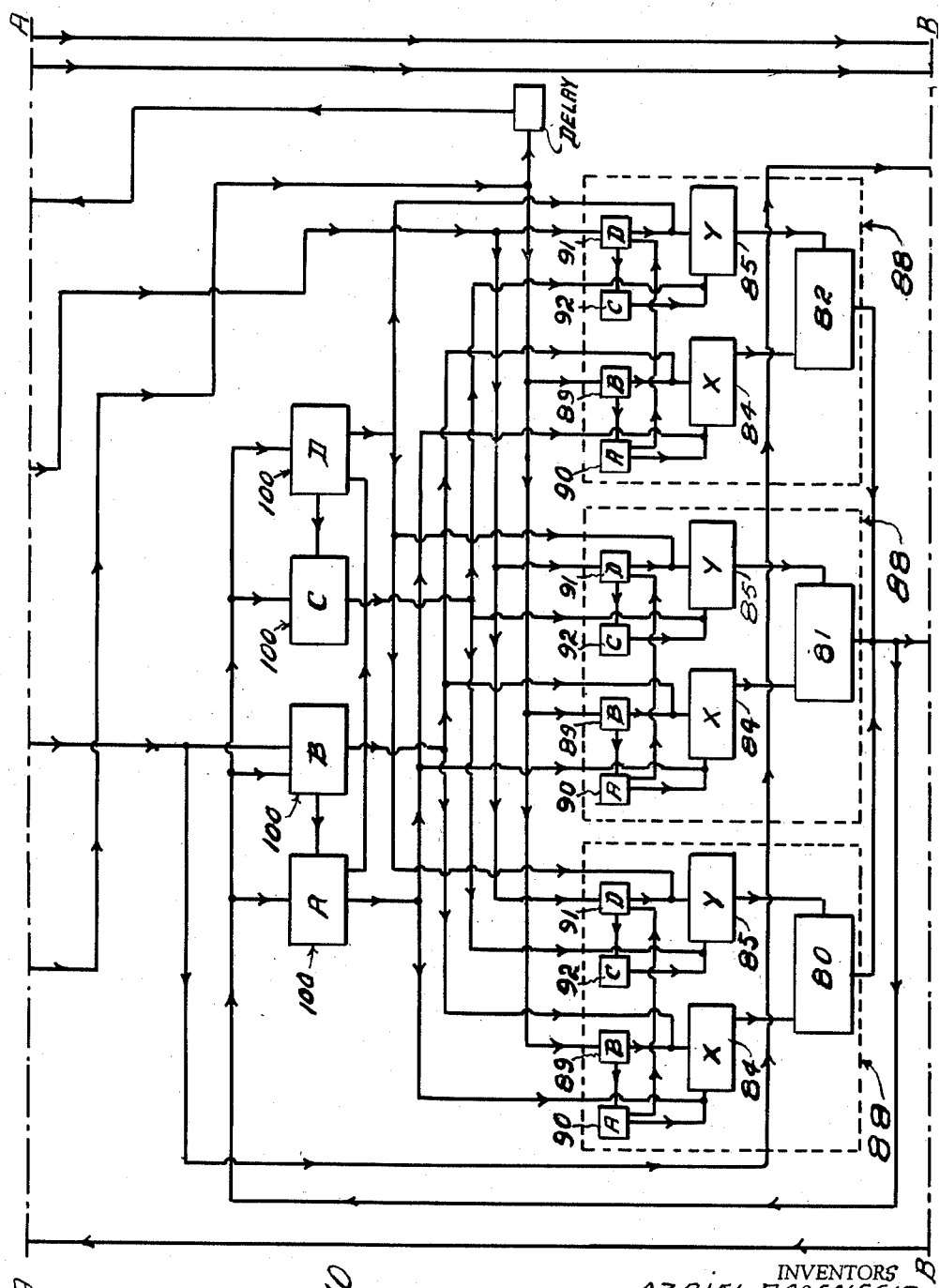

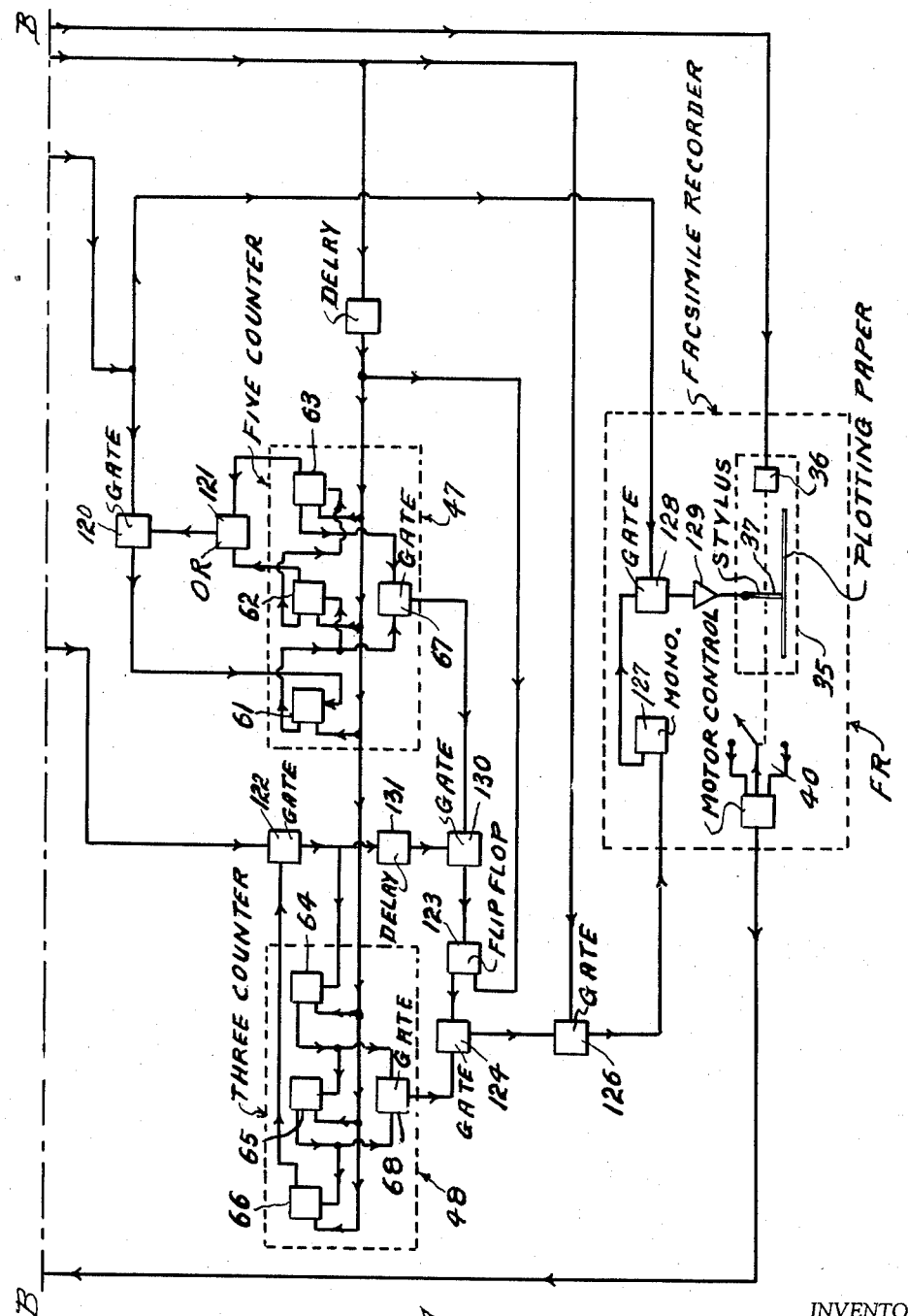

2,910,910

AUTOMATIC STEREOPLOTTER

Azriel Rosenfeld, New York, Kenneth W. Gross, Forest Hills, and Donald C. Gala, Elmhurst, N.Y., assignors to Sperry Rand Corporation, Ford Instrument Company Division, Long Island City, N.Y., a corporation of Delaware Application December 20, 1957, Serial No. 704,026

16 Claims. (Cl. 88—14)

This invention relates to apparatus for automatically plotting contour maps from aerial photographs, in which the basic principles of stereoscopic vision and the stereoscope are utilized.

As is well known, there are several different types of stereoscopes, one of which is known as the anaglyphic type, the basic principles of which are utilized in the present invention. In this type two photographs of the same terrain which are simultaneously taken from slightly separated points are projected in different colors, usually one being in red and the other in blue-green, and are superimposed in matching relation. The resulting composite picture, or anaglyph, is viewed by one eye through a red filter and by the other eye through a blue-green filter, so that each eye sees only one of the pictures, thus producing an illusion of depth.

The mechanism of this invention comprises generally a stereoviewer, a magnetic recorder, an electronic computer, and a facsimile recording unit. The stereoviewer comprises generally a rigid framework having a horizontal mounting plate adjustably secured to the upper end thereof for vertical adjustment toward and away from the frame. A vertically adjustable horizontal viewing table is suitably mounted within the framework between the upper and lower ends thereof. A pair of similar projecting units, each of which comprises a photograph holder, an adjustable light source and a projecting lens, are adjustably mounted upon the mounting table in spaced relation to each other. A scanning unit consisting of a television camera, such as a vidicon camera, for example, is also adjustably mounted upon the mounting plate.

The magnetic recorder is a conventional drum type recorder of standard construction in which the drum is provided with seven side-by-side parallel channels or paths which extend circumferentially around the drum. Three of these channels are each provided with a magnetic input head and a magnetic output head, and the other four channels are each provided with an output head, the function and operation of which will be explained in detail hereinafter.

The computer comprises generally a comparison and digitizing circuit, a magnetic memory, a 3-counter and a 5-counter.

The facsimile recorder comprises generally a horizontal table on which a sheet of plotting paper is adapted to be secured, and a stylus which is adapted to be successively moved across the sheet in straight parallel paths and is operative to successively dot the sheet in accordance with information supplied thereto by the scanning camera through the recorder and computer units.

The general operation of the mechanism in plotting a contour map of a terrain shown in a pair of anaglyphic photographs and projected onto a viewing table to form an anaglyph will now be briefly explained. A more detailed description will be made hereinafter in connection with the drawings. In setting the mechanism in operation the operator first projects the two photographs, by the projecting units, through appropriate light filters, onto the viewing table or screen to form a stereo-model thereabove. In setting the mechanisms in operation certain preliminary adjustments and settings must be made initially by the operator which include projecting the two photographs by the projecting units through appropriate light filters, onto the viewing table in proper oriented relation with respect to each other to thereby produce a correct stereo model above the table. The operator then determines the location of any contour level, the contour interval and vertical extent of the contour levels. After these values have been ascertained the operator sets the mechanism for automatic operation by positioning the viewing table at the lowest contour level in the model, adjusting the table elevating mechanism in accordance with the desired contour interval, removing the colored light filters from the projectors and putting the lamps on strobe operation, adjusting the intensities of the two lamps until the illumination reaching the table from each lamp is the same. The operator now starts the plotter on its automatic scan and allows it to begin plotting while he manually aligns the facsimile recorder so that the printing sweep is at the margin of the sheet, and finely adjusts the light intensity levels until the map being printed is optimum. After these adjustments have been made a clean sheet of facsimile paper is placed on the facsimile recorder table in proper position and the plotter returned to its initial position at the lowest contour level, after which the automatic scan is begun again. From then on the operation is entirely automatic, requiring no attention by the operator until the entire plotting of the map has been completed.

In operation, after the initial computations and adjustments have been made, the television scanning camera automatically successively scans a plurality of straight parallel side-by-side paths which cover the entire area of the screen. Each path comprises a great plurality of successive adjacent square spots, each of which represents a definite area of the terrain shown in the photographs, and each of which is individually scanned during each sweep of the scanning camera along a path. Each path is successively scanned twice, first with only one projector lamp turned on and then with only the other projector lamp turned on. The information obtained in the first sweep of each path is transmitted to and stored in the magnetic recorder. The information obtained in the second sweep of each line is fed directly into the computer, bypassing the magnetic recorder, and simultaneously therewith the information obtained in the first sweep is fed from the magnetic recorder into the computer. The comparison and digitizing circuit compares the light intensities of each spot in a path, as obtained in the first and second sweeps, to see whether or not each spot in a path can possibly be on the surface of the stereo model. If the light intensities are equal for any spot, which indicates that the spot can be on the surface of the stereo model, the circuit indicates this by producing an output pulse which is stored in the digital memory unit; and if the light intensities are unequal, which indicates that the spot cannot be on the model surface, no output pulse is produced. So far the mechanism has only determined the possibility of a spot being on a contour, since it is possible that two different points of the terrain may have equal brightness. But the computer can determine that a spot is probably on a contour by comparing adjoining bits of possibility information after three complete paths of this information have been stored.

The existence of information for three complete paths permits a comparison to be made for a square group of nine spots, where the center spot is the spot of interest. Due to the continuity of contour lines it is established that the center spot of a group of nine spots cannot be on a contour line unless two other spots in the group of nine spots are possibly on a contour. The computer performs the appropriate comparisons, and between the conclusion of the storage of the digital information from the third path and the beginning of the storage of the information of the digital information from the fourth path, a series of computations are made in the computer for one complete line, which is the second line. The output of the computer is a series of bits of information for the second path. This series controls the marking of a series of dots on the sheet in the facsimile recorder. As this process is repeated, path by path, the dots that are printed form the contour lines. After a plane has been completely scanned, as above, the viewing table and screen are automatically raised to the next contour level and the scanning process repeated for as many contour levels as required.

The principal object of the invention is to provide a new and improved stereo plotting apparatus for automatically plotting contour lines for the area of overlap of a given pair of aerial stereo photographs.

Another object of the invention is to provide a stereo plotting apparatus of the aforesaid character which will considerably shorten the time required for such plotting and which, after the initial adjustments and calibrations required have been made by the operator, will be entirely automatic and will not require the attendance of the operator.

Another object of the invention is to provide a stereo plotting apparatus of the aforesaid character in which a magnetic storage and computer system is capable of taking in light intensity information from a television scanning camera at two different times, recognizing those points where the light intensity is the same at both times, and distinguishing certain patterns of such points.

Another object of the invention is to provide a stereo plotting apparatus of the aforesaid character in which a pair of stereo aerial photographs are projected onto a viewing table in overlapping relation to provide a stereo model above the table, intermittently elevating the table so that it is successively passed through the stereo model at successive contour levels, a television scanning camera successively scans a plurality of straight side by side parallel paths on the screen, each of which comprises a plurality of successive adjacent square spots, each path being successively scanned twice, first with only one projector light turned on and then with only the other projector light turned on, and the information thus received imparted to a storage-computer mechanism for comparison to determine whether or not a spot can possibly be on the surface of the stereo model.

Another object of the invention is to provide a stereo plotting apparatus of the aforesaid character in which, after three paths have been scanned, comparisons are successively made by the computer of square groups, of nine spots each, to determine whether or not a spot which may possibly be on the surface of the stereo model is probably on the surface of the stereo model.

Still another object of the invention is to provide in a stereoplotter of the aforesaid character means by which spots, which have been determined as probably being on the surface of the stereo model, are automatically marked in proper position on a facsimile plotting sheet in response to signals imparted by the storage computer mechanism.

Having stated the principal objects of the invention, other and more limited objects of the invention will be apparent from the following specification and the accompanying drawings forming a part thereof, in which:

Fig. 1 is a diagrammatic layout of the automatic contour plotting mechanism;

Fig. 2 is a schematic front elevation of the stereoviewer used in the plotting mechanism;

Fig. 3 is a schematic plan view of the stereoviewer shown in Fig. 2;

Fig. 4 is a schematic front elevation of the facsimile recorder used in the plotting mechanism;

Fig. 5 is a schematic plan view of the facsimile recorder shown in Fig. 4;

Fig. 6 is a diagrammatic layout of one of the three similar memory planes, and the drivers therefor, of the coincident magnetic memory of the electronic computer used in the plotting mechanism;

Fig. 7 is a block diagram of the input circuit for the drivers of each of the memory planes;

Fig. 8 is a block diagram of the output circuit for the drivers of each of the memory planes;

Figs. 9, 10 and 11 connected together on the lines A—A and B—B constitute a circuit diagram of the entire plotting mechanism; and Fig. 12 is a diagrammatic view graphically illustrating the theory of light intensity matching, which is one of the basic principles upon which the apparatus of this invention are based.

Referring now to the drawings by reference character, the stereoplotter of the present invention comprises a stereoviewer generally indicated by the symbols SV, a magnetic recorder generally indicated by the symbols MR, an electronic computer generally indicated by the symbols EC and a facsimile recorder generally indicated by the symbols FR.

The stereoviewer SV, which is schematically shown in Figs. 2 and 3 of the drawings, comprises a framework 1 having four vertical posts 2 which are rigidly connected together at the upper ends thereof by struts 3 and adjacent to the lower ends thereof by a base plate 4. A pair of vertically spaced platforms 5 and 6 are rigidly secured to the posts 1 above the base plate 4. A mounting plate 7 is adjustably secured to and above the framework 1, by adjusting screws 8, for vertical adjustment toward and away from the frame 1; and a vertically adjustable viewing table 9 is disposed within the framework 1 above the platform 6. The viewing table 9 is secured, at the center thereof, to the upper end of a large diameter screw 10 which is carried by the platform 6. The screw 10 is adapted to be adjusted up and down and with it the viewing table 9, through suitable elevating mechanism mounted upon the platform 5, either manually by means of a crank 12 or automatically by a motor 13 also mounted upon the platform 5. A plurality of guideposts 14, which extend upwardly from the table 6 and through complementary apertures in the viewing table 9, are provided to prevent turning or cocking of the viewing table 9 during adjustment thereof.

A pair of similar projecting units 20 and 21 are adjustably mounted, in longitudinally spaced relation to each other, upon the mounting plate 7 by any suitable adjusting means (not shown). Various different means may be utilized for this purpose. Such means are shown in the patents to Harry T. Kelsh No. 2,451,031 and No. 2,492,879, issued Oct. 12, 1948 and Dec. 27, 1949, respectively.

The projecting units 20 and 21 are similar to the projecting units disclosed in the patent to Kelsh No. 2,451,031 and operate in the same manner to project a pair of stereophotographs onto the viewing table 9 in oriented overlapping relation to thereby form a stereo model over the table 9. As shown in the aforesaid patent, each projector 20 and 21 comprises a light source, light condensing lens and a projecting lens, and means are provided between the condensing lens and the projecting lens for removably supporting a photographic plate and a light filtering device in proper spaced relation to each other and to the condensing and projecting lenses. The light sources 22 and 23 for the projecting units 20 and 21 respectively are preferably strobotron tubes which can be pulsed by signals from timer channels and provide overall illumination of the entire stereo model. The depth of focus of the projectors 20 and 21 is such as to include the entire volume of the stereo model.

A scanning unit 24 comprising a conventional vidicon camera is also adjustably mounted upon the mounting plate 7 for longitudinal and transverse adjustment, both manual and automatic, by suitable conventional means not shown. The scanning unit 24, after the initial preliminary adjustments have been made, is operative to automatically successively scan a plurality of successive adjacent spots in a plurality of straight side-by-side parallel paths at each contour level in the stereo model, and to impart the information received to the magnetic recorder MR and the computer EC which in turn in conjunction with each other control the operation of the facsimile recorder FR in accordance with the information imparted by the scanning unit. During scanning each path is successively scanned twice, first with only the light 22 of the projector 20 turned on and then with only the light 23 of the projector 21 turned on, before the next succeeding adjacent path is scanned. The information obtained by the first sweep, i.e. with the projector 20, is imparted to and stored in the magnetic recorder MR, and the information obtained by the second sweep, i.e. with the projector 21, is imparted directly to the computer EC, bypassing the magnetic recorder MR. Simultaneously with the second sweep of a path by the scanning unit 24 the information obtained during the first sweep is read out of the magnetic recorder and imparted to the computer.

The amount of scanning required depends upon the size of the map being prepared and the number of contour levels to be plotted. Assume that a pair of 9" x 9" stereophotographs are magnified five times in setting up the stereo model. On account of overlap the actual area of the stereo model is 45" x 27", and the poor accuracy at the edges of the stereo model limits the map to 42" x 24". The number of contour levels to be plotted, which depends on the difference between the elevations of the highest and lowest points of the terrain, determines the time required for plotting a map. Obviously, the greater number of levels the longer the time. Let it be further assumed that thirty different contour levels are to be plotted in one hour, and that each spot in the paths represents an area 0.060 of an inch square on the five times enlarged map, or a 0.012 inch square in the photograph. Based on this spacing of spots and size of the map the scanning unit 24 must investigate a lattice 700 spots long by 400 spots wide by 30 levels high in one hour. This allows two minutes for scanning each contour level, or 300 milliseconds for each 700-spot path. The slowest presently practical television scanning speed is used, namely, 1/60 second, or 16.7 milliseconds, for a path of 700 spots. In order to facilitate the storing of the intensity information imparted by the scanner to the magnetic recorder, and to allow time for computing and recording, only one line is scanned every 300 milliseconds.

Since the scanning of each path requires two sweeps of the scanner, the sequence of events during the 300 milliseconds available for scanning each line is as follows: At zero time the light 22 of the projector 20 is turned on. To allow time for the response of the vidicon camera tube, the electronic sweep of the path does not commence until time 100 milliseconds. The sweep is completed at time 117 milliseconds, and the information obtained stored. The light 22 is then turned off. At time 130 milliseconds the light 23 of the projector 21 is turned on. At time 230 milliseconds the second sweep of the same path commences and is completed at time 247 milliseconds. Simultaneously with the second sweep of the path the information obtained during the first sweep thereof is read out of storage and is compared with the information obtained during the second sweep, by the computer. The scanner is then indexed one path and starting at time 300 milliseconds the process is repeated for the next path.

Since it is necessary to sweep each path twice, the entire operation of comparing amplitudes from the two photographs requires accurate registration of the two sweeps, so that the second sweep will coincide with the first sweep spot by spot. The vidicon will do this if the voltages and currents applied thereto during the two sweeps are identical. Consequently the sweep circuits, focusing voltage, etc. must be highly stable.

The vidicon is a slow responsive device and in order for it to closely approach its steady state output it is necessary for it to be exposed to light for a period of many milliseconds. This is the reason for the choice of a comparatively slow rate for the strobe lighting, and for the fact that a sweep is not initiated until 100 milliseconds after the appropriate light was turned on.

During each scanning of a path the scanner is indexed step by step from spot to spot by an electronic saw-tooth generator 25, suitably triggered, and in indexed from path to path, through a precision resistor bank 28, by a switch 26 which is driven by a motor 27.

The theory of light intensity matching of spots on the surface of the stereo model, as utilized herein, is graphically illustrated in Fig. 12. It will be recalled that the depth of focus of the twin projectors includes the entire volume of the stereo model formed by projecting the pair of stereo aerial photographs onto the table or screen in overlapping oriented relation. Therefore the light passing through any point on the stereo model originates from only one spot on each photograph. Since the arrangement of the two projectors and the plotting table is geometrically similar to the arrangement of the cameras and the terrain when the photographs were taken, it can be seen that the light at any spot on the surface of the stereo model will originate from photographic spots which are the images of the same terrain spot.

If the terrain is assumed to reflect light diffusely, the same terrain spot will have equal brightness per unit area on each photograph. Therefore at points on the surface of the stereo model the intensities of the light coming from the two projectors will be in some constant ratio for all spots on the surface of the stereo model. By controlling the brightness of one projector lamp this ratio may be made unity. This is shown in Fig. 12 where spot A on the surface of the stereo model receives equal illumination from both photographs. By comparison point B is illuminated by light from the left photograph whose intensity corresponds to the brightness of C, and by light from the right photograph whose intensity corresponds to the brightness of D, where the spots C and D in the original terrain are of unequal brightness. The difference in light intensity between C and D can be measured at B to show that B is not on the surface of the stereo model.

The facsimile recorder FR, which is provided to print the contour map from a series of pulses received from the computer, is generally similar to standard facsimile recorders and comprises a table 31, on which the facsimile plotting paper is placed, and a shelf 32 therebelow, both of which are mounted on table legs 33. Secured to the top of the table 31 along two opposed edges thereof are a pair of spaced similar parallel tracks 34 on which is mounted a stylus carriage 35 which is adapted to be driven back and forth by a synchronous motor 36, through suitable mechanism on the shelf 32. A recording stylus 37 of conventional construction is suitably mounted upon the carriage 35 for back-and-forth straight line movement and is driven back and forth by a synchronous motor 38. Manual adjusting means 39 are provided by which the carriage 35 and stylus 37 may be initially set in proper position. During recording the writing stylus 37 is moved over the recording paper in synchronism with the output of the computer, which is determined by a train of print pulses received from the magnetic recorder. The stylus translates across the paper with one sweep every 300 milliseconds; and the entire stylus carriage, which is intermittently moved across the table in accordance with the path being scanned by the scanner, traverses the map area in 120 seconds, during which time the stylus plots the information for 400 paths.

When the carriage reaches the end of its travel it trips a reversing switch 40 which reverses the carriage motor 36, causes the viewing table elevating motor 13 to raise the viewing table 9 one contour level, reverses the motor 27 which drives the switch 26 controlling the indexing of the scanner from path to path, and changes the amplitude of the signal being used for marking the paper.

Thus, at the end of recording all the information for one contour level, the process is repeated for each of the other contour levels, with the intensity of marking for successive contour levels being alternately dark and light.

The magnetic recorder MR is a conventional commercially available magnetic recorder of the drum type. It comprises a magnetizable drum 70 which is adapted to be rotated one revolution every 300 milliseconds by a motor 71. The drum 70 is provided with seven channels numbered Ch 1, Ch 2, Ch 3, Ch 4, Ch 5, Ch 6, Ch 7, respectively. Channel Ch 1 is provided with a pair of suitably positioned output heads $a$ and $d$; channel Ch 2 is provided with a pair of suitably positioned output heads $b$ and $e$; channel Ch 3 is provided with an input head $c$ and an output head $f$ suitably positioned and spaced with respect to each other; channel Ch 4 is provided with a suitably positioned output head $g$; channel Ch 5 is provided with a suitably positioned output head $h$; channel Ch 6 is provided with a suitably positioned head $i$; channel Ch 7 is provided with a suitably positioned output head $j$.

The primary purpose of the magnetic recorder MR is to bring the outputs of the two corresponding sweeps of a path by the scanner 24 into time-coincidence, but it is also used to control the sequential timing of the various different elements of the plotter. The several heads $a$ to $j$ inclusive must therefore be properly positioned with respect to the rotating drum 80 and to each other to effect this sequential operation.

The time-coincidence of the two corresponding sweeps of a path is accomplished by delaying the output of the first sweep by 130 milliseconds, which is the time spacing between the two sweeps. Channel Ch 3 and heads $c$ and $f$ are used for this purpose. The information obtained during the first sweep of a path is recorded by the head $c$ in channel Ch 3 and is played back by the head $f$ to the difference amplifier 49 of the comparison and digitizing circuit 45. The signal from the first sweep is admitted to the recorder through a gate 72, suitably triggered, which is thereafter closed to reject the signal from the second sweep of the path which bypasses the recorder and is imparted directly to the difference amplifier 49. Thus only the first sweep of a path is delayed. During the recording of the first sweep of successive paths the information previously recorded in channel Ch 3 is erased by the head $c$ during the first sweep of the next succeeding path.

Two problems immediately appear. The first is synchronization; the second is fidelity.

The problem of synchronization results from the requirement that the time delay in the recorder be equal to the time between the two sweeps with an accuracy of less than half the time it takes the sweep to pass one spot, in order for the spot-by-spot-amplitude comparsion to be meaningful. The accuracy required is therefore less than half of 24 microseconds, as compared to 130 milliseconds, or better than 0.1%. This can be accomplished by a very simple method, whereby not only is the output of the vidicon recorded, but whereby the pulse that starts the vidicon sweep is recorded in channel Ch 2. When the signal from the first sweep is played back by head $f$ the initiating pulse for the second sweep is also played back, causing the second sweep to start. The second sweep is thus exactly synchronized with the playing back of the first sweep, regardless of the exact time delay of the magnetic recorder.

The need for fidelity is obvious, since comparison of the two sweeps is worthless if the first is distorted during the recording and playback process. Three subrequirements exist; high frequency response, low frequency response, and amplitude.

The high frequency response is limited to 100 kc. for the type of commercially available recorder used. This corresponds to a recording speed of 60 inches per second, from which it can be computed that the two $c$ and $f$ heads must be 7.8 inches apart. This high frequency response is more than adequate. The rate of scanning is 700 spots per sixtieth of a second, or 42,000 spots per second. An enormous gray scale can be accepted without exceeding the upper frequency limit of the recorder.

The low frequency response of the recorder used is limited to 100 c.p.s. While in theory the signal received from the vidicon could be a pulse of 16.7 ms. duration with no modulation, which could not be recorded with fidelity due to the low frequency involved, this is of no practical importance; it could only occur if the intensity on the photograph was exactly equal at every spot along the entire sweep line. In any practical case, variations in intensity along a path provide sufficient modulation to lift the lowest frequency above the minimum recording frequency. Provision is made for restoration of the D.C. level.

The amplitude output of the magnetic recorder, including amplifier, is normally equal to the input. However, the exact value is of no significance providing it is constant during the run, because the operator in originally adjusting the illumination levels will be correcting, as a side-effect, for deviations in recorder gain from unity.

One defect of any magnetic recorder that cannot be corrected is "drop-out," which is caused by occasional defective spots or dirt on the drum, and which results in marked amplitude error at these points. If this amplitude error occurred at a contour point, it would cause failure to mark that point on the contour. However, high quality recording in a closed, clean container should have so few drop-outs that the occasional 0.06″ gaps in otherwise complete contours will cause no confusion.

As previously stated, for purposes of synchronization, the magnetic recorder is used both to store the results of the first sweep and to initiate the second sweep of each path. The initiation is essentially a timing function. This use of the magnetic recorder for timing is extended to cover control of virtually all operations in the stereoplotter. This is desirable because it guarantees that all operations are suitably synchronized regardless of line frequency or voltage changes, temperature changes, etc. Channel Ch 3, used for storage, continually has information recorded, played back, and erased. The other six channels, used for timing, have suitable sine waves and pulses recorded at manufacture, and are used for play-back until worn out.

The signals from the timing channels are used for the following purposes:

Channel Ch 1, using heads $a$ and $d$ suitably spaced, has two pulses recorded which are used to turn the two strobe lights 22 and 23 on and off at the correct times.

Channel Ch 2, using heads $b$ and $e$ suitably spaced, has a single pulse recorded, and starts the two sweeps of the vidicon at the correct times.

Channel Ch 4, using head $g$, has a 42 kc. sine wave recorded for part of its length, which is used to digitize the difference between the vidicon outputs during the first and second sweeps, and to control the memorization of this digital information.

Channel Ch 5, using head $h$, has a 22.5 kc. sine wave recorded for part of its length, which is used to control the reading out of information from the digital memory, to control the five-counter 47 in the computer, and to supply excitation for the facsimile recorder.

Channel Ch 6, using head $i$, has a train of pulses recorded, spaced 415 microseconds apart, to control the five-counter 47 and the output gate 126 of the computer.

Channel Ch 7, using head $j$, has a motor-synchronizing frequency recorded, which drives both the facsimile drive motor and the vertical sweep motor 13.

The computer EC has two inputs and one output. The inputs are two pulses of 16.7 ms. duration for each line of sweep, modulated by the information obtained during the two sweeps of a path. The information is received by the computer during the second sweep of the path. It consists of the information obtained from the second sweep, plus the information from the first sweep as read out of storage in the magnetic recorder. The output of the computer is a train of zero or one pulses. Each group of 700 bits, corresponding to one path, is delivered during the time of 283 ms. between inputs. The computer thus has a total repeating cycle of 300 ms., the time for one line.

The electronic computer EC comprises a comparison and digitizing circuit 45, a coincident current magnetic memory 46, a 5-counter 47, and a 3-counter 48.

The comparison and digitizing circuit 45 comprises a difference amplifier 49, an inverter 50, an amplifier 51, a D.C. restorer 52, a Schmitt trigger 53 and a gate 54.

The difference amplifier 49 receives as input signals the two vidicon output signals, one directly and the other via the magnetic recorder. The difference amplifier 49 subtracts them and delivers an output which is the point by point difference. The difference signal when negative is passed through a diode; when positive it is inverted by the inverter 50. In either case it is delivered to the D.C. amplifier 51 and D.C. restorer 52. The only signal of interest to the amplifier 51 is zero or close thereto. Gain is required in order that any significant deviation from zero be detectable. This detection of deviations from zero which are all of the same polarity, due to the inverter 50, is accomplished by the Schmitt trigger 53.

The Schmitt trigger 53 is a conventional circuit which has an output at constant peak value whenever the input exceeds a specific voltage. The output is therefore a continuous signal which is either high or low, depending on whether or not the difference signal is within the prescribed tolerance of zero. This signal is applied to the gate 54 for digitation.

The gate 54 receives the output of the Schmitt trigger 53, with suitable polarity, and opens whenever the difference signal is near zero. The signal that is passed through the gate 54, when it is open, is a series of pulses derived from the 42 kc. signal read from channel Ch 4 of the magnetic recorder by the read-out head $g$. During the sixtieth of a second that elapses during the sweep of a line, 700 bits of information are thus produced, which are available for storage in the memory 46.

The 5-counter 47 comprises three triggers, 61, 62 and 63 and a gate 67; and the 3-counter 48 comprises three triggers 64, 65 and 66 and a gate 68.

The magnetic memory 46 comprises three similar memory planes 80, 81 and 82 each of which comprises seven hundred cores 83, there being a corresponding core 83 for each of the 700 spots in a scanned path. The output of the comparison and digitizing circuit 45 with respect to each spot scanned is imparted to the corresponding core 83 in one of the memory planes 80, 81 or 82 by suitable means to be described. The information from every third path scanned is stored in a different memory plane. The first, fourth, seventh, tenth etc. path information is stored in memory plane 80; the second, fifth, eighth, eleventh etc. path information is stored in memory plane 81; and the third, sixth, ninth, twelfth etc. path information is stored in memory plane 82. Each spot in each path scanned is compared with spots in the adjacent paths on each side thereof by the memory planes to determine whether or not a spot, previously determined by the comparison and digitizing circuit as possibly being on the surface of the stereo model, is probably on the surface of the stereo model. If the memory 46 determines that a spot is probably on the surface of the stereo model the memory planes in conjunction with the five-counter and the magnetic recorder effect operation of the facsimile recorder to mark a dot in the proper position on the facsimile sheet. After a memory plane can contribute no further information it is erased and information from a new path is imparted thereto.

The arrangement of the cores 83 in each of the memory planes 80, 81 and 82 and the driving planes for energizing these cores are shown in Fig. 6. As shown therein, the seven hundred cores 83 are arranged in spaced parallel longitudinal and transverse rows. There are twenty-eight longitudinal rows of twenty-five cores each and twenty-five transverse rows of twenty-eight cores each, which are designated by the coordinates X—X, for the transverse rows and Y—Y for the longitudinal rows. The X—X rows of cores 83 in the memory planes 80, 81 and 82 are energized by driving planes 84, and the Y—Y rows of cores 83 are energized by driving planes 85. The driving planes 84 each comprise twenty-five cores 86 which are arranged in five transverse rows of five cores each designated by the coordinate A—A, and five longitudinal rows of five cores each designated by the coordinate B—B; and the driving planes 85 each comprises thirty cores 87, only twenty-eight of which are used, arranged in six transverse rows of five cores each designated by the coordinate C—C, and five longitudinal rows of six cores each designated by the coordinate D—D.

The cores 86 and 87 in each of the X and Y driving planes 84 and 85 for the memory planes 80, 81 and 82 are energized by write-in circuits 88, there being one write-in circuit 88 for each memory plane. Each write-in circuit 88, as shown in Fig. 7, comprises a B five-counter 89, an A five-counter 92, each of which includes three triggers 93. The B five-counter 89, through drivers 94, is operative to energize the B coordinate transverse rows of cores 86 of the X driving plane 84, and the A five-counter 90, through drivers 95, is operative to energize the A coordinate longitudinal rows of cores 86 of the X driving planes 84. The D six-counter 91, through drivers 96, is operative to energize the transverse D coordinate rows of cores 87 of the Y driving plane 85, and the C five-counter, through drivers 97, is operative to energize the longitudinal C coordinate rows of cores 87 of the Y driving plane 85.

In energizing the memory planes 80, 81 and 82 in accordance with the output of the comparison and digitizing circuit 45 in conjunction with the magnetic recorder MR, a series of writing timing pulses are imparted through the output head $g$ to a write-in circuit 88 from channel Ch 4 of the magnetic recorder MR at the rate of 42 kc. These, in conjunction with the bits of information from the digitizing circuits, are used to energize the A, B, C, and D coordinate rows of the X and Y driving planes 84 and 85 in such a sequence as to energize the cores in the memory plane.

The B coordinate rows are each driven by a driver tube (see Fig. 7), all five of which in turn are driven by the B five-counter 89, that is, three trigger circuits so designed that they count to five, and then reset to zero. The effect of this is that the five B coordinate rows are energized in sequence as the timing pulses are received, with a complete cycle once for every five timing pulses.

One output of the B five-counter 89 is a series of re-set pulses at one-fifth the fundamental rate, or 8.4 kc. These pulses drive the A five-counter 90, which is identical to the B five-counter 89, which drives the driver tubes 95 that energize the A coordinate rows. The A rows are consequently energized in sequence as the timing pulses are received, but at one-fifth the rate of the B coordinate row cycling, with one complete cycle for every 25 timing pulses received.

The effect of energizing the A and B coordinate rows of the X driving planes 84 in correct sequence is to energize the X coordinate rows of the memory plane in the proper sequence.

In a similar manner, appropriate counters and driving tubes are supplied to energize the C and D coordinate rows of the Y driving plane. However, in this case, the D rows are driven at ⅕ the rate of the A rows. That is, the D coordinate rows are driven by the re-set output of the A five-counter 90. Also, the D coordinate rows are only energized when a "one" bit is received from the comparison and digitizing circuit. The C coordinate rows are driven in proper sequence by the D re-set counter 91 pulse driving the C five-counter 92.

For example, suppose that during the sweep of a line by the vidicon, amplitude comparison indicates that spot number 276, out of 700, is a possible contour point. During the receipt of 276 timing pulses, the B five-counter 89 has gone through 285/5 or 55 complete cycles, and would be back to the 2 row. Similarly, the A five-counter 90 has gone through 275/25, or 11 complete cycles and would be back to the 1 row. This energization of the $A_1$ and $B_1$ lines in X driving plane causes the $X_1$ line in the memory plane to be energized (see Fig. 6). Similarly, the C row and the D row would be in the 2 and 6 positions, respectively. Because spot 276 is a possible contour point, the $D_6$ row would be energized, as well as the $C_2$ row, thus energizing the $Y_{12}$ row. Because the $X_1$ and $Y_{12}$ rows are energized, core number 276 in the memory plane would be energized, thus storing the "one" information concerning spot 276. If, however, amplitude comparison for spot 276 had indicated that it could not be a contour point, the resulting digital bit would be zero and the D row would not have been energized; therefore, the Y rows would not have been energized and core 276 would have been left de-energized, and in this manner would have stored the zero information concerning spot 276.

The results of comparisons of information stored in the three memory planes 80, 81 and 82 are imparted, through the three-counter 48, to the facsimile recorder FR by four similar read out circuits 100. One read out circuit is provided for the B coordinate rows of the three X driving planes 84; one for the A coordinate rows of the three X driving planes 84; one for the D coordinate rows of the three Y driving planes 85, and one for the three C coordinate rows of the Y driving planes 85.

The reading circuits are designed to read the digital information out of storage in the correct sequence. This requires that three bits be read from the first line scanned, i.e., from the first memory plane, then three from the second, and then three from the third. This completes the first pattern of nine for comparison. Then the second pattern must be read out, consisting of the second, third, and fourth bits from each line.

In order to read out the stored information in the correct sequence, it is necessary to excite the A, B, C and D rows of each of the three sets of driving planes in the correct sequence. This causes the stored information to appear at the output of the memory plane.

The read-out circuits 100, as shown in Fig. 8, each comprises a seven-counter 101, a three-counter 102, a gate 103, an inverter 104, and a logic circuit 105, for the A, B, C and D coordinate rows of the X and Y driving planes 84 and 85 for the memory plane 80; a seven-counter 106, a three-counter 107, a gate 108, an inverter 109 and a logic circuit 110 for the A, B, C and D coordinate rows of the X and Y driving planes 84 and 85 for the memory planes 81; and a seven-counter 111, a three-counter 112, a gate 113, an inverter 114 and a logic circuit 115 for the A, B, C and D coordinate rows of the X and Y driving planes 84 and 85 for the memory plane 82. The three-counters 102, 107 and 112 hold the input gates 103, 108 and 113 open until three timing pulses are received, and then close the gates.

Prior to the beginning of these computations, the circuits have been re-set as follows: all seven-counters 101, 106 and 111 reset to zero; three-counter 102 re-set to zero; three-counter 107 and three-counter 112 re-set to 3. As a result of this, gate 103 is initially open, and gates 108 and 113 are initially closed. The timing pulses received from the magnetic recorder consequently pass through the gate 103 and seven-counter 101 to energize B coordinate rows 1, 2 and 3 in the driving plane 84 for the memory plane 80. The three-counter 102 at this time, having counted to 3, closes gate 103, and delivers a re-set pulse to three-counter 107. This opens gate 108, which permits the next three timing pulses to pass and excite B coordinate rows 1, 2 and 3 in the driving plane 84 for the memory plane 81. Three-counter 107 then closes gate 108, re-sets three-counter 112, opens gate 113, and permits the next three timing pulses to excite B coordinate rows 1, 2 and 3 in the driving plane 84 for the memory plane 2. When three-counter 112 has counted to 3, it re-sets three-counter 102 to zero, and the process repeats.

However, when repeating, it is desired to excite rows 2, 3 and 4 instead of 1, 2 and 3. This is accomplished by the seven-counters. Each seven-counter consists of 3 triggers. The various trigger outputs are suitably connected through the logic circuits to the B rows so that rows 1, 2 and 3 are successively energized. The shifting to the 2, 3 and 4 rows is accomplished by indexing the seven-counter one count, by use of the re-set output pulse of the associated three-counter to subtract one. The sequence of counts required for the driving plane is: 1, 2, 3; 2, 3, 4; 3, 4, 5; 5, 1, 2, etc. A seven-counter is used for the B lines read out, rather than a five-counter, because counting to 7 avoids the complications associated with counting 4, 5, 1; 5, 1, 2. The logic circuits are designed so that when the counter reads 6, it is interpreted as 1, and when the counter reads 7, it is interpreted as 2. Therefore the seven-counter counts as follows: 1, 2, 3; 2, 3, 4; 3, 4, 5; 4, 5, 6; 5, 6, 7; 1, 2, 3, etc., which is obviously far simpler than counting to 5, but which nevertheless drives the B rows correctly due to suitable interpretation.

The read-out circuits for the A, C and D rows of the driving planes 84 and 85 are not shown and described in detail herein since they are similar to the previously described circuits for the B rows.

It can be noted that each bit of stored information is used many times, and must be rewritten each time it is read out.

The purpose of the five-counter 47 is to select the fifth pulse out of the group of nine that are needed for each computation. The computations are made at the rate of one every 415 microseconds. Pulses at that interval are obtained through the head $i$ from channel Ch 6 of the magnetic recorder to reset the triggers in the five-counter 47 to their zero condition prior to beginning the computation.

The five-counter contains three trigger circuits 61, 62 and 63 as shown in Figure 10. Each trigger is a bistable circuit which changes its state whenever it receives a negative pulse, and which gives out a negative pulse whenever it goes from the "one" state to the zero state.

The pulses which are counted are received through the head $h$ from the channel Ch 5 of the magnetic recorder at a 22.5 kc., 44 microsecond, rate. These pulses are passed through an input gate 120 inverted, and then applied to the input of trigger 61. The output of trigger 61 drives trigger 62, whose output drives trigger 63.

The states of the triggers after each successive pulse is received are as follows:

|         | Trigger 61 | Trigger 62 | Trigger 63 |
|---------|------------|------------|------------|
| Reset   | 0          | 0          | 0          |
| Pulse 1 | 1          | 0          | 0          |
| Pulse 2 | 0          | 1          | 0          |
| Pulse 3 | 1          | 1          | 0          |
| Pulse 4 | 0          | 0          | 1          |
| Pulse 5 | 1          | 0          | 1          |
| Pulse 6 | 0          | 1          | 1          |

The outputs of triggers 61 and 63 are both applied to the output gate 67. The output of the gate 67 exists only when both inputs are "one." It can be seen from the above table that this occurs only between pulse 5 and pulse 6. The output of gate 67 is the output of the five-counter 47, a pulse started by the 5th pulse and stopped by the 6th.

In order to avoid any further counting, it is desirable to stop the five-counter 47 after the sixth pulse. This is accomplished by having the input gate 120 controlled by the "Or" circuit 121. The "Or" circuit 121 delivers an output if either one input or the other input exists. The output of the "Or" circuit 121 keeps the input gate 120 open. The "Or" circuit is operated from the reciprocal outputs of triggers 62 and 63, the reciprocal output being "one" when the normal output is zero, and vice versa. As can be seen from the above table, the reciprocal outputs of triggers 62 and 63 are never both zero until after the sixth pulse. Until the sixth pulse the input gate 120 is held open; both reciprocal outputs of the triggers 62 and 63 are zero, the "Or" output drops to zero, and the input gate 120 is closed. Nothing further occurs until the next reset pulse starts the next computation.

Consequently, the output of the five-counter 47 is a pulse started by the fifth pulse and stopped by the sixth; that is, it is effectively the fifth pulse slightly delayed.

The same pulses, nine in a group, that were the input of the five-counter, are also used to read out the nine bits of memorized information needed. The nine bits are either "one" (a pulse) or zero. The purpose of the three-counter 48 is to count the number of "ones," to determine that there are three of them, and that one coincides with the fifth pulse selected by the five-counter 47.

The three-counter 48 receives its input train of pulses from the memory 46 through its input gate 122, which is initially open. The output of gate 122 then actuates the three triggers 64, 65 and 66 in sequence. These triggers operate in a similar manner to the triggers 61, 62 and 63 in the five-counter 47, and their states as pulses are received as follows:

| Pulse | Trigger 64 | Trigger 65 | Trigger 66 |
|-------|------------|------------|------------|
| 0     | 0          | 0          | 0          |
| 1     | 1          | 0          | 0          |
| 2     | 0          | 1          | 0          |
| 3     | 1          | 1          | 0          |
| 4     | 0          | 0          | 1          |

The output of trigger 66 closes gate 122 at the fourth pulse, so that no further pulses are received.

Meanwhile, the train of pulses from gate 122 is applied to gate 130, slightly delayed by the delay 131. Since gate 130 is opened by the fifth timing pulse from the five-counter 47, only that memorized pulse which coincides with the fifth timing pulse is passed; this is the pulse corresponding to the center, or fifth, of the nine spots being compared. The output of gate 130 is stored in a flip-flop 123 which opens a gate 124. Gate 124 then passes the output of gate 68 (i.e., the third memorized pulse), provided it occurs simultaneously with or after the fifth timing pulse.

The output of gate 124 is thus in the form desired; there is an output pulse if the center spot and exactly two others of the pattern of nine are possibly contour points. If a memorized pulse is not received for the center spot, gate 130 is not opened, and there is no output. If two other memorized pulses, for a total of three, are not received, gate 68 is not opened, and there is no output. If more than three memorized pulses are received, the fourth pulse leaves triggers 64 and 65 in the zero condition, which re-closes gate 68, and returns the output of gate 124 to zero.

The output of gate 124, if present, opens gate 126 to pass the print pulse from head $i$, channel 6 of the magnetic recorder, which arrives after the ninth timing pulse and immediately before the re-set pulse. This re-set pulse marks the end of the computation for the spot (and its group of nine), and re-sets all circuits to the zero condition prior to the start of the next computation.

The print pulse, if passed by gate 126, is then sent to the facsimile recorder as an order to print. This short pulse is converted into a pulse of approximately 300 microsecond duration by a monostable multi-vibrator 127, which opens the facsimile gate 128. The gate 128 then passes an A.C. signal of 22.5 kc., received through the head $h$ from channel Ch 5 of the magnetic recorder MR. After power amplification by an amplifier 129, this signal marks the facsimile sheet.

The general operation of the plotter will now be stated.

The two input signals from the vidicon are subtracted in the difference amplifier 49, and the difference is digitized in such a manner that a "one" digit is obtained when the two input signals are equal, and a zero digit when they are unequal. Each "one" digit indicates a spot that may possibly be on a contour line. This train of 700 digits is memorized. This information, as well as information from the two previous lines, is read out of storage as required for the following computation. Consider the following array of map spots:

|       |     |     |     |
|-------|-----|-----|-----|
| Row 1 | (1) | (2) | (3) |
| Row 2 | (4) | (5) | (6) |
| Row 3 | (7) | (8) | (9) |

To determine whether spot 5 should be marked in the facsimile printer, the following logic applies:

The first requirement is that spot 5 be possibly on the contour, as determined from the amplitude comparison previously discussed.

The second requirement is that any two other spots in the group of nine also meet the "possibility" criterion. This is based on the principle that contour lines are continuous, so that, for example, if spot 5 is the only "possible" point in the array of 9, it must be spurious. The reasoning that a contour line might pass other spots and through spot 5, thus making spot 5 appear isolated, is rejected because of the closeness of the spots; even though a contour line is in theory of zero thickness, in practice it represents a band of terrain indistinguishably close to the contour elevation and of sufficient width not to be able to pass between spots.

The third requirement is that not more than three spots out of the nine meet the "possibility" criterion. The purpose of this is to reject areas or plateaus which would otherwise be marked solidly on the final map. It is recognized that occasional spots which are actually on contours might not be printed due to this last limitation, but such occasional gaps in otherwise continuous contour lines are not expected to confuse the cartographer.

Once the computer has determined that these three requirements have been met, spot 5 can be considered to be not merely possibly, but probably, on a contour. The word "probably" is used out of conservatism: while one could not state with certainty that this point, or any other, is on a contour and is not merely one of a fortuitous combination of spurious points, this probability is sufficiently high that it is believed that the small number of spurious points printed will not interfere with map-reading.

A train of 9 pulses is received from timing channel Ch 5 in the magnetic recorder through head *h*. These are counted in the five-counter 47, and the fifth spot is selected. The 9 pulses are also used to read out the memorized digital information relating to these 9 spots. The memorized information is in each case either zero or "one." If it is zero, no pulse is read out. The number of "one" pulses is counted by the three-counter 48. If the number of pulses is exactly three, and if one of these coincides with the fifth pulse selected by the five-counter 47, the computer supplies an output signal in the form of a pulse. This pulse is used to cause the facsimile recorder to print a dot on the contour map sheet.

From the foregoing it will be apparent to those skilled in this art that we have provided a very sufficient and comparatively simple method and apparatus for electronically plotting contour maps from a pair of stereoscopic aerial photographs which is fully automatic in its operation after the apparatus has been initially adjusted and put in operation, and by which the other objects of the invention are accomplished.

It is to be understood that we are not limited to the specific construction shown and described herein as various modifications may be made therein within the spirit of the invention and the scope of the appended claims.

What is claimed is:

1. An apparatus for automatically plotting contour maps from aerial stereoscopic photographs comprising a vertically adjustable viewing table, a pair of similar projecting units by which a pair of stereoscopic photographs are projected onto said table in overlapping oriented relation to form a stereo model thereabove, a television scanning unit by which successive contour levels in said stereo model are successively scanned, means whereby said scanning unit is operative to successively scan succeeding adjacent spots in a plurality of straight side-by-side parallel paths in each contour level, an electronic computing mechanism to which information from said scanning unit is imparted, a facsimile recorder; and control means by which said projecting units, said scanning unit, said computing mechanism and said recorder are all rendered operative in timed relation to each other; means whereby said computing mechanism is operative to determine that a scanned spot is or is not on the surface of the stereo model at the contour level being scanned and to impart a signal to said facsimile recorder when a spot is determined to be on the surface of said stereo model, and means whereby said facsimile recorder is operative in response to signals from said computing mechanism to mark lines of successive dots on a facsimile sheet corresponding in positions on said sheet to the positions in said stereo model of the spots represented by said dots.

2. An apparatus for automatically plotting contour maps from stereoscopic aerial photographs as defined in claim 1, in which means are provided by which said viewing table is automatically raised one contour level in response to a signal from said facsimile recorder at the completion of the scanning of each contour level.

3. An apparatus for automatically plotting contour maps from stereoscopic aerial photographs comprising a vertically adjustable viewing table, a pair of similar projecting units by which a pair of stereoscopic photographs are projected onto said viewing table in oriented overlapping relation to form a stereo model above said table, a television camera scanning unit by which a plurality of straight side-by-side parallel paths in each of a plurality of successive different contour levels in said stereo model are successively scanned, means by which said scanning unit is successively indexed from spot to spot along each path and by which said scanning unit is indexed from each path to the next adjacent path at the completion of the scanning of each path; means whereby said scanning unit is operative to successively scan each path twice, first with only one projecting unit turned on and then with only the other projecting unit turned on, before scanning the next succeeding path; a magnetic recorder in which the information obtained during the first scanning of each path is stored, an electronic computer to which the information obtained during the second scanning of each path is directly imparted bypassing said magnetic recorder and to which the information obtained by the first scanning of each path and stored in said magnetic recorder is imparted by said magnetic recorder simultaneously with the second scanning of each path, and a facsimile recorder; means whereby said electronic computer is operative to analyze the information obtained during the first and second scanning of successive paths and imparted thereto during the second scanning of each path to determine that a scanned spot is or is not on the surface of said stereo model at the contour level being scanned and to impart a signal to said facsimile recorder when a spot is determined to be on the surface of said stereo model; means whereby said facsimile recorder is operative in response to signals imparted thereto by said computer to mark lines of successive dots on a plotting sheet corresponding in positions on said sheet to the positions on said stereo model of the spots represented by said dots; and means whereby said magnetic recorder is also operative to control the operation of said projecting units, said scanning unit, said electronic computer and said facsimile recorder in sequentially timed relation to each other.

4. An apparatus for automatically plotting contour maps from stereoscopic aerial photographs as defined in claim 3, in which means are provided by which said viewing table is automatically raised one contour level in response to a signal from said facsimile recorder at the completion of the scanning of each contour level.

5. An apparatus for automatically plotting contour maps from stereoscopic aerial photographs as defined in claim 3, in which said electronic computer comprises a comparison and digitizing circuit to which the information obtained by said scanning unit is imparted, and a coincident magnetic memory in which the output of said comparison and digitizing circuit is stored, means whereby said comparison and digitizing circuit is operative to determine from the information imparted thereto from said scanning unit whether or not a scanned spot can possibly be on the surface of said stereo model and if determined that a spot may be on the surface of the said stereo model to impart a signal to said memory, and means whereby said memory is operative to compare the successive spots in one path which have been determined as possibly being on the surface of said stereo model with the spots in adjacent paths on each side of said one path and determine whether or not a spot in said one path is probably on the surface of said stereo model and if a spot in said one path is determined as probably being on the surface of said stereo model to impart a signal to said facsimile recorder, and means by which said facsimile recorder marks a dot on the said plotting sheet in response to said signal.

6. An apparatus for automatically plotting contour maps from stereoscopic aerial photographs as defined in claim 5 in which the said coincident magnetic memory comprises three memory planes each of which comprises a plurality of cores which in number correspond to the number of spots in a path, each of said planes being adapted to receive and store the output of said comparison and digitizing circuit from one of each three consecutive paths scanned and to compare the successive spots in the middle path of each of three adjacent paths with the spots in the two paths on each side thereof to determine whether or not a spot in said middle path is probably on the surface of said stereo model.

7. An apparatus for automatically plotting contour maps from stereoscopic aerial photographs as defined in claim 6 in which said electronic computer also comprises a 3-counter and a 5-counter which are operative in conjunction with each other to impart a signal to mark a dot to said facsimile recorder for each spot which has been determined by said electronic computer as probably being on the surface of said stereo model.

8. An apparatus for automatically plotting contour maps from stereoscopic aerial photographs as defined in claim 7, in which means are provided by which said viewing table is automatically raised one contour level in response to a signal from said facsimile recorder at the completion of the scanning of each contour level.

9. An apparatus for automatically plotting contour maps from stereoscopic aerial photographs as defined in claim 8 in which said facsimile recorder comprises a table on which a plotting sheet to be marked is adapted to be placed, a carriage which is adapted to be indexed transversely of said table with the path being scanned by said scanner, and a marking stylus which is mounted on said carriage and is adapted to be indexed longitudinally of said carriage in accordance with the spots in a path being scanned.

10. An apparatus for automatically plotting contour maps from stereoscopic aerial photographs comprising, means by which a pair of stereoscopic photographs are projected on to a viewing screen in overlapping oriented relation to form a stereo model above said screen, means by which a plurality of straight parallel side-by-side paths at a given contour level in said stereo model are successively scanned twice by successively scanning successive adjacent spots in each path, means by which the information received during the second scanning of a path is compared with the information received during the first scanning of the said path to determine whether or not a scanned spot is probably on the surface of said stereo model, and means by which a dot is marked on a plotting sheet in a position corresponding to the position of said scanned spot on said stereo model in response to a signal from said comparing means when a scannel spot has been determined as probably being on the surface of said stereo model.

11. An apparatus for automatically plotting contour maps from stereoscopic aerial photographs comprising, means by which a pair of stereoscopic photographs are projected on to a viewing screen in overlapping oriented relation to form a stereo model above said screen, means by which a plurality of straight parallel side-by-side paths at a given contour level in said stereo model are successively scanned twice by successively scanning successive adjacent spots in each path, means by which the information received during the first scanning of a path is stored, means by which the information received during the second scanning of a path is compared with the information received during the first scanning of the said path to determine whether or not a scanned spot is probably on the surface of said stereo model, and means by which a dot is marked on a plotting sheet in a position corresponding to the position of said scanned spot on said stereo model in response to a signal from said comparing means when a scanned spot has been determined as probably being on the surface of said stereo model.

12. An apparatus for automatically plotting contour maps from stereoscopic aerial photographs as defined in claim 10, in which control means is also provided by which said projecting means, said scanning means, said comparing means and said dot marking means are all rendered operative in sequentially timed relation to each other.

13. An apparatus for automatically plotting contour maps from stereoscopic aerial photographs comprising, means by which a pair of stereoscopic photographs are projected on to a viewing screen in overlapping oriented relation to form a stereo model above said screen, means by which a plurality of straight parallel side-by-side paths at a given contour level in said stereo model are successively scanned twice by successively scanning successive adjacent spots in each path, means by which the information received during the first scanning of a path is stored, means by which the information received during the first scanning of a path is compared with the information received during the first scanning of said path to determine whether or not a spot is possibly on the surface of said stereo model, a second comparing means by which each spot in a path which has been determined as possibly being on the surface of said stereo model is compared with a plurality of spots in adjacent paths of each side thereof to determine whether or not the said each spot is probably on the surface of said stereo model, and means by which a dot is marked on a plotting sheet in a position corresponding to the position of the said each spot on said stereo model in response to a signal from said second comparing means when a scanned spot has been determined as probably being on the surface of said stereo model.

14. An apparatus for automatically plotting contour maps from stereoscopic aerial photographs as defined in claim 13 in which control means is also provided by which said projecting means, said scanning means, said storing means, said comparing means, said second comparing means, and said dot marking means are all rendered operative in sequentially timed relation to each other.

15. An apparatus for automatically plotting contour maps from stereoscopic aerial photographs comprising, means by which a pair of stereoscopic photographs are projected on to a viewing screen in overlapping oriented relation to form a stereo model above said screen, means by which a plurality of straight parallel side-by-side paths at a given contour level in said stereo model are successively scanned twice by successively scanning successive adjacent spots in each path, means by which the information received during the second scanning of a path is compared with the information received during the first scanning of the said path to determine whether or not a scanned spot is possibly on the surface of said stereo model, a second comparing means by which each spot in a path which has been determined as possibly being on the surface of said stereo model is compared with a plurality of spots in adjacent paths of each side thereof to determine whether or not the said each spot is probably on the surface of said stereo model, and means by which a dot is marked on a plotting sheet in a position corresponding to the position of the said each spot on said stereo model in response to a signal from said second comparing means when a scanned spot has been determined as probably being on the surface of said stereo model.

16. An apparatus for automatically plotting contour maps from stereoscopic aerial photographs as defined in claim 15 in which control means is also provided by which said projecting means, said scanning means, said comparing means, said second comparing means, and said dot marking means are all rendered operative in sequentially timed relation to each other.

References Cited in the file of this patent

UNITED STATES PATENTS

| 1,396,047 | Nistri | Nov. 8, 1921 |
| 2,283,226 | Porter | May 19, 1942 |
| 2,493,543 | Merchant | Jan. 3, 1950 |
| 2,626,989 | Brown | Jan. 27, 1953 |
| 2,798,115 | Wiens | July 2, 1957 |

FOREIGN PATENTS

| 537,740 | France | Mar. 8, 1922 |